Oct. 24, 1933.   C. W. PIERSON   1,931,936
LIQUID DISPENSING AND MEASURING DEVICE
Filed Dec. 23, 1931
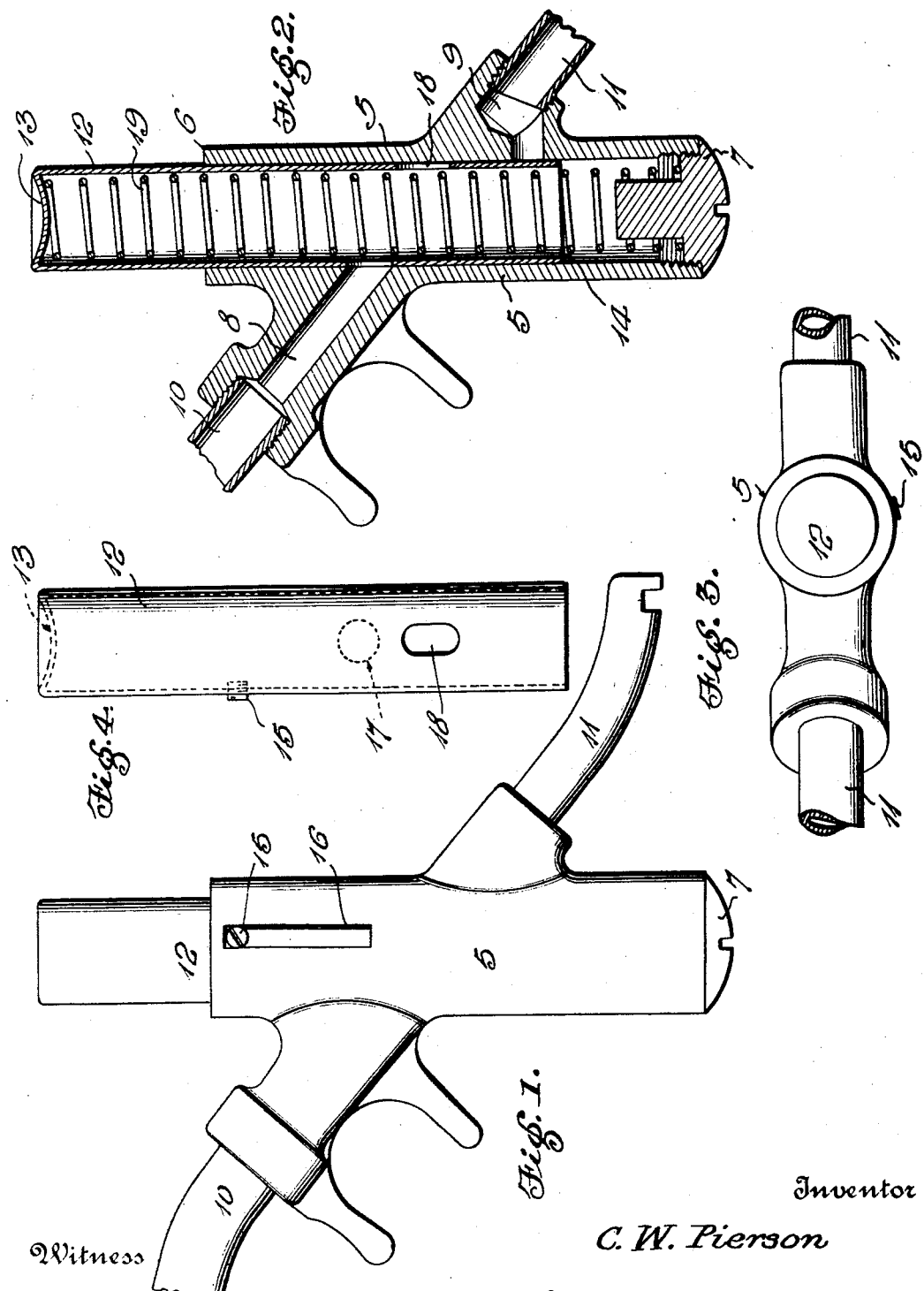
Inventor
C. W. Pierson Patented Oct. 24, 1933

1,931,936

UNITED STATES PATENT OFFICE 1,931,936

LIQUID DISPENSING AND MEASURING DEVICE

Charles William Pierson, Te Aroha, New Zealand

Application December 23, 1931, Serial No. 582,829, and in New Zealand January 5, 1931

1 Claim. (Cl. 221—104)

The invention aims to provide an exceptionally simple and inexpensive, yet an efficient, accurate and convenient device for dispensing and measuring small quantities of liquid, the device being intended primarily for administering medicines to animals, although it is not restricted to this particular field of use.

With the foregoing in view, the invention resides in the novel subject matter hereinafter described and claimed, description being accomplished by reference to the accompanying drawing:

Fig. 1 is a side elevation.
Fig. 2 is a vertical sectional view.
Fig. 3 is an upper end view.
Fig. 4 is a side elevation of the tubular plunger.

A preferred structure has been shown and will be specifically described, with the understanding however, that within the scope of the invention as claimed, minor variations may be made.

The numeral 5 denotes a vertically elongated cylinder having an open upper end 6, but closed at its lower end by a screw plug 7. At one side, the cylinder 5 is provided with a lateral liquid inlet 8 which preferably declines toward said cylinder, and at its opposite side, this cylinder is provided with a lateral liquid outlet 9 which is spaced below the inlet 8. A pipe 10 is shown threaded into the inlet 8 and said pipe may lead from a suitable reservoir containing the liquid to be measured and dispensed. A nozzle 11 is shown threaded into the outlet 9 and declining therefrom for discharging the liquid upon the tongue of an animal.

Slidable in the cylinder 5, is a tubular plunger 12 having a closed upper end 13 and an open lower end 14. The ascent and descent of this plunger are limited by a stud 15 carried thereby, and a slot 16 in the cylinder 5, said slot receiving said stud. The plunger 12 is provided with an inlet 17 normally registering with the inlet 8, and is further provided with an outlet 18 below said inlet 17 and normally spaced above the outlet 9. A spring 19 within the plunger 12 and bearing at its ends against the plunger end 13 and the screw plug 7, normally holds said plunger in the raised position shown in the drawing, with the inlets and outlets related as illustrated in Fig. 2. With the parts so positioned, liquid may gravitate into the cylinder 5 and the plunger 12 through the registering inlets 8 and 17, until the liquid level reaches the upper end of said inlet 17, at which point entrance of liquid will cease unless there be considerable head or pressure behind the liquid in the pipe 10, under which condition, the liquid will rise somewhat higher. Upon depression of the plunger 12, the plunger inlet 17 moves out of communication with the cylinder inlet 8 considerably before the plunger outlet 19 communicates with the cylinder outlet 9. Consequently, during the interval between the closing of the inlet and opening of the outlet, the air in the plunger 12 above the liquid, will be compressed, with the result that this compressed air aids in quickly ejecting the liquid from the plunger when the plunger outlet 18 communicates with the cylinder outlet 9. The quantity of liquid dispensed is that existing between the liquid level in the plunger 12 and the lower end of the plunger outlet 19.

It will be seen from the foregoing that I have provided a very simple and practical device for carrying out the objects of the invention, and while the preferred details have been disclosed, attention is again invited to the fact that within the scope of the invention as claimed, minor variations may be made.

I claim:—

A liquid dispensing and measuring device comprising a vertical liquid-receiving cylinder having a closed lower end, an open upper end, a lateral inlet and a lateral outlet spaced downwardly from said inlet; a normally raised tubular plunger slidable in said cylinder and projecting from the upper end thereof, said plunger having an open lower end and a closed upper end, said plunger being provided with an inlet normally registering with said inlet of said cylinder and of a size to freely conduct liquid into said plunger and cylinder, said plunger being further provided with an outlet normally spaced above said outlet of the cylinder, and means for limiting the ascent and descent of said plunger, said inlets and outlets being so spaced that communication of said inlets is cut off prior to communication between said outlets upon depression of the plunger, thereby compressing air in the upper end of the plunger above the liquid contained in said plunger and said cylinder to facilitate discharge of said liquid upon registration of said outlets.

CHARLES WILLIAM PIERSON.